(12) United States Patent
Herrera Covarrubias et al.

(10) Patent No.: US 12,391,194 B1
(45) Date of Patent: Aug. 19, 2025

(54) VEHICLE INTERIOR TRIM PANEL ASSEMBLY

(71) Applicant: Ford Global Technologies, LLC, Dearborn, MI (US)

(72) Inventors: Lemuel Enrique Herrera Covarrubias, Benito Juarez/CDMX (MX); Josue David Mayren Hernandez, Coacalco/Estado de Mexico (MX); Karina Isela Bravo Zarate, Cuautitlan/Edo de Mexico (MX); Pablo Isaac Villalva Sanchez, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/946,205

(22) Filed: Nov. 13, 2024

(51) Int. Cl.
*B60R 13/02* (2006.01)
*B60R 21/21* (2011.01)

(52) U.S. Cl.
CPC .......... *B60R 13/0237* (2013.01); *B60R 21/21* (2013.01); *B60R 2013/0287* (2013.01)

(58) Field of Classification Search
CPC .............. B60R 21/213; B60R 13/0237; B60R 2013/0287
See application file for complete search history.

(56) References Cited

U.S. PATENT DOCUMENTS 7,793,972 B2   9/2010  Downey
7,841,619 B2 * 11/2010  Miyamoto ............. B62D 39/00
                                              280/728.3
2002/0167152 A1  11/2002  Preisler et al.
2003/0111828 A1   6/2003  Dominissini
2004/0075250 A1   4/2004  Choi
2004/0212185 A1  10/2004  Daines et al.
2005/0057024 A1 * 3/2005  Weston ................... B60R 21/21
                                              280/730.2

(Continued)

FOREIGN PATENT DOCUMENTS

CN        201703341 U      1/2011
CN        104044549 A  *   9/2014  ........... B60R 13/025

(Continued)

OTHER PUBLICATIONS

"Audi A4 B8—How remove the trim on the front A pillars" (https://youtu.be/LZzEKGE-ddA?si=OD-5FVE_fUtclE-J), Dec. 15, 2019.

(Continued)

*Primary Examiner* — Nicole T Verley

(74) *Attorney, Agent, or Firm* — Frank A. MacKenzie; Brooks Kushman P.C.

(57) ABSTRACT

A vehicle includes a vehicle body and a trim panel supported by the vehicle body. An airbag is between the trim panel and the vehicle body. The trim panel includes a back side facing the vehicle body. The trim panel includes a base portion and a distal portion. The trim panel includes a weakened area between the base portion and the distal portion on the back side. An elastomeric member is connected to the back side at the base portion and the distal portion. The elastomeric member extends across the weakened area from the base portion to the distal portion.

18 Claims, 7 Drawing Sheets

(56) References Cited

U.S. PATENT DOCUMENTS

| | | | |
|---|---|---|---|
| 2006/0220357 A1* | 10/2006 | Lizak | B60R 21/2338 296/193.06 |
| 2007/0241542 A1 | 10/2007 | Wallace | |
| 2008/0001384 A1* | 1/2008 | Catron | B60R 13/025 280/730.2 |
| 2008/0197609 A1* | 8/2008 | Jaramillo | B60R 21/213 280/730.2 |
| 2008/0224453 A1* | 9/2008 | Downey | B60R 21/216 280/743.2 |
| 2014/0312600 A1* | 10/2014 | Verner | B60R 13/0206 296/1.02 |
| 2019/0141467 A1 | 5/2019 | Breed | |
| 2020/0406851 A1* | 12/2020 | Gammill | B60R 21/232 |
| 2021/0094384 A1* | 4/2021 | Astrike | B60H 1/3421 |
| 2022/0118935 A1* | 4/2022 | Dhruna | B60R 13/025 |

FOREIGN PATENT DOCUMENTS

| | | | | |
|---|---|---|---|---|
| CN | 110481483 A | * | 11/2019 | |
| CN | 221213889 U | * | 6/2024 | |
| CN | 222663381 U | * | 3/2025 | |
| DE | 102006053745 A1 | * | 5/2008 | ........... B60R 13/025 |
| DE | 102018200230 A1 | | 7/2019 | |
| DE | 102018218212 A1 | * | 4/2020 | |
| DE | 102021111897 A1 | * | 12/2021 | ............. B60R 13/02 |
| EP | 1790537 A1 | * | 5/2007 | ........... B60R 21/232 |
| JP | 2008062754 A | * | 3/2008 | ........... B60R 13/025 |
| JP | 4539323 B2 | | 9/2010 | |
| KR | 20050099673 A | | 4/2006 | |
| KR | 20070036456 A | | 4/2007 | |
| KR | 101357343 B1 | | 2/2014 | |
| KR | 20190100764 A | | 11/2019 | |
| WO | 2003059701 A1 | | 7/2003 | |
| WO | WO-2018228778 A1 | * | 12/2018 | |
| WO | WO-2020263384 A1 | * | 12/2020 | ........... B60R 21/213 |

OTHER PUBLICATIONS

Haubitz, "A combined support structure that blends technology and design—to ensure the safety of your customers", Case study, Pillar trim (A/B/C/D), Nov. 25, 2001.

"How to Remove D Pillar Trim 2008-2013 Cadillac CTS Sedan, Coupe & Wagon 3.0 3.6 V6 Replacement AWD", (https://youtu.be/a3zmdE8DJHY?si=uzwQarKC0l7bU6TN), Jun. 2, 2023.

* cited by examiner

VEHICLE INTERIOR TRIM PANEL ASSEMBLY

BACKGROUND

Vehicles are equipped with airbag assemblies that include an airbag and an inflator. In the event of a vehicle impact, the inflator activates and provides inflation medium to the airbag. This pressurizes the airbag to control the kinematics of an occupant during the vehicle impact. The airbag assemblies may be located at various positions in passenger compartment of the vehicle. Vehicles may include airbags supported on a dash, side air curtains mounted to roof rails, seat-mounted airbag, etc.

DETAILED DESCRIPTION

Figure 1:
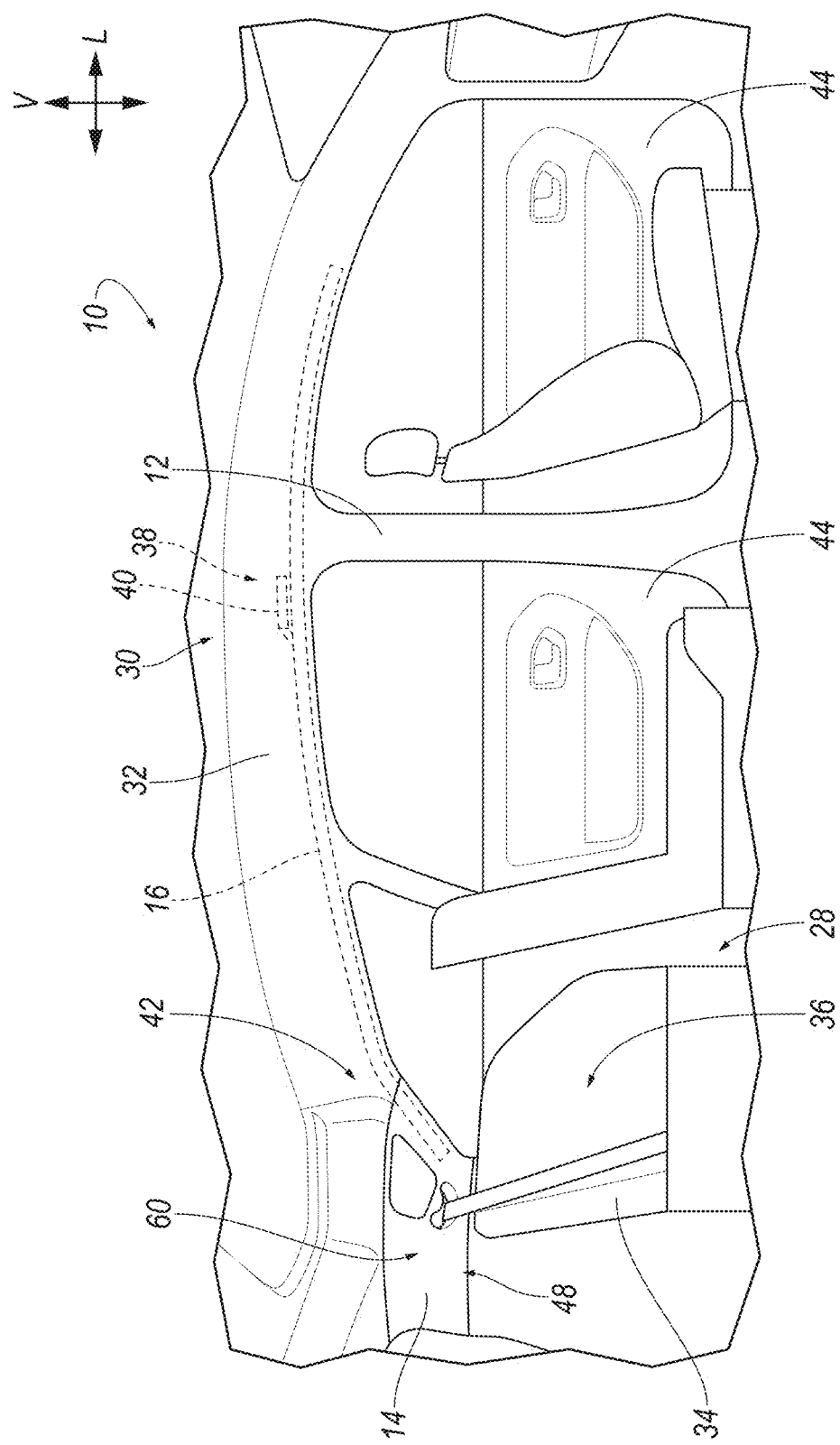
FIG. 1 is a side view of an occupant cabin of a vehicle with an airbag in an uninflated position behind a trim panel assembly.

With reference to the Figures, wherein like numerals indicate like parts throughout the several views, a vehicle 10 includes a vehicle body 12 and a trim panel 14 supported by the vehicle body 12. An airbag 16 is between the trim panel 14 and the vehicle body 12. The trim panel 14 includes a back side 18 facing the vehicle body 12. The trim panel 14 includes a base portion 20 and a distal portion 22. The trim panel 14 includes a weakened area 24 between the base portion 20 and the distal portion 22 on the back side 18. An elastomeric member 26 is connected to the back side 18 at the base portion 20 and the distal portion 22. The elastomeric member 26 extends across the weakened area 24 from the base portion 20 to the distal portion 22.

During inflation of the airbag 16 from an uninflated position (FIG. 1) to an inflated position (FIG. 2), the trim panel 14 bends at the weakened area 24 and the distal portion 22 rotates relative to the base portion 20. Since the weakened area 24 is on the back side 18 of the trim panel 14, the weakened area 24 is not visible to occupants of the vehicle 10. Due to the elastic properties of the elastomeric member 26, as discussed further below, the elastomeric member 26 allows the trim panel 14 to bend at the weakened area 24, and since the elastic member is connected to the base portion 20 and the distal portion 22, the elastomeric member 26 retains the distal portion 22 to the base portion 20 as the airbag 16 rotates the distal portion 22 relative to the base portion 20. This configuration allows for compact design of the trim panel 14 and packaging of the airbag 16 to accommodate packaging and styling constraints in the vehicle 10 as a well as constraints on mounting the trim panel 14 to the vehicle body 12.

The vehicle 10 may be any suitable type of automobile, e.g., a passenger or commercial automobile such as a sedan, a coupe, a truck, a sport utility, a crossover, a van, a minivan, a taxi, a bus, etc. The vehicle 10 defines an occupant cabin 28. With reference to FIG. 1, the vehicle 10 defines a vehicle-longitudinal axis L extending between a front end (not numbered) and a rear-end (not numbered) of the vehicle 10. The vehicle 10 defines a vehicle-lateral axis extending cross-vehicle from one side to the other side of the vehicle 10. The vehicle 10 defines a vertical axis V extending through the floor and roof 30 of the vehicle 10. The vehicle-longitudinal axis L, the vehicle-lateral axis, and the vertical axis V are perpendicular relative to each other.

The vehicle 10 includes a vehicle body 12. As an example, the vehicle body 12 may be of a unibody construction in which a vehicle frame and the vehicle body 12 are a unit (including frame rails, pillars, roof rails, etc.), and as another example, the vehicle body 12 and a vehicle frame may have a body-on-frame construction (also referred to as a cab-on-frame construction) in which the vehicle body 12 and vehicle frame are separate components, i.e., are modular, and the vehicle body 12 is supported on and affixed to the frame. Alternatively, the vehicle body 12 may have any suitable construction. The vehicle body 12 may be of any suitable material, for example, steel, aluminum, and/or fiber-reinforced plastic, etc.

The vehicle body 12 includes body panels. The body 12 panels may include structural panels, e.g., rockers, pillars, roof rails, etc. The vehicle body 12 defines the occupant cabin 28 to house occupants of the vehicle 10.

The vehicle 10 includes a floor and may include a roof 30. The roof 30 may define the upper boundary of the occupant cabin 28 and may extend from the front end of the occupant cabin 28 to the rear end of the occupant cabin 28. The roof 30 may include roof rails elongated along the vehicle-longitudinal axis L, roof beams elongated along the vehicle-lateral axis between the roof rails, and a roof panel supported by the roof rails and/or the roof beams. The floor is below the roof 30. The floor defines the lower boundary of the occupant cabin 28 and may extend from the front end of the occupant cabin 28 to the rear end of the occupant cabin 28. The floor may include a floor panel and may include a covering, e.g., carpet. The seat 34 is supported by the floor, i.e., the weight of the seat 34 is borne by the floor. Specifically, the seat 34 is supported by the floor panel of the vehicle body 12.

The vehicle body 12 includes the doors 44 openable for occupants to enter and exit a passenger cabin. The roof rails contact a top edge of the doors 44 when the doors 44 are closed. The door 44 includes a window opening that may be completely closed by a window of the window is in a fully raised position.

The vehicle 10 may include a headliner 32 mounted to the roof 30 and providing a class-A surface to the roof 30. The headliner 32 may be upholstered. In some examples, the headliner 32 may be of a known type. The headliner 32 may be designed to deform during inflation of the airbag 16 from the uninflated position to the inflated position, as shown in the example in FIG. 2. The headliner 32 may be designed for any type of roof structure and features, including moonroofs, sunroofs, panoramic roofs, etc.

The vehicle 10 includes one or more seats 34 in the occupant cabin 28. The vehicle 10 may include any suitable number of seats 34. The seats 34 may be arranged in the occupant cabin 28 in any suitable position, i.e., as front seats, second-row seats, third-row seats, etc. The seats 34 may be of any suitable type, e.g., a bench seat, a bucket seat, etc. In the example shown in the Figures, the trim panel 14 is on a rear pillar 42 adjacent to the third-row seats. In other examples, the trim panel 14 may be on any suitable part of body 12, e.g., other pillars. The trim panel 14 is shown on a left side of the vehicle 10. The vehicle 10 may include a second trim panel 14 on the right side of the vehicle 10, in which examples the second trim panel 14 may be a mirror image of the trim panel 14.

The seat 34 defines at least one occupant-seating area 36. The occupant-seating area 36 is the space occupied by an occupant properly seated on the seat 34. The occupant-seating area 36 is seat-forward of a seatback of the seat 34 and above a seat bottom of the seat 34. The occupant-seating area 36 of the seat 34 is adjacent the trim panel 14. In other words, the trim panel 14 is next to the occupant-seating area 36 with no other components between the trim panel 14 and the occupant-seating area 36.

The vehicle 10 includes an airbag assembly 38 including the airbag 16 and an inflator 40. The airbag 16 is a side curtain airbag 16. The inflator 40 inflates the airbag 16 to the inflated position. The airbag 16 in the uninflated position is supported by the roof 30. The airbag 16 may, for example, include connectors such as clips, threaded fasteners, etc., for attaching the airbag 16 to the roof 30. The airbag 16 may be rolled and/or folded in the uninflated position. The airbag 16 in the uninflated position may be between the roof 30 and the headliner 32, as shown in FIG. 1. A portion of the airbag 16 extends between the trim panel 14 and the vehicle body 12, e.g., the rear pillar 42, in the uninflated position, as shown in FIG. 1. Specifically, a portion of the airbag 16 is between the distal portion 22 of the trim panel 14 and the vehicle body 12 in the uninflated position.

Figure 2:
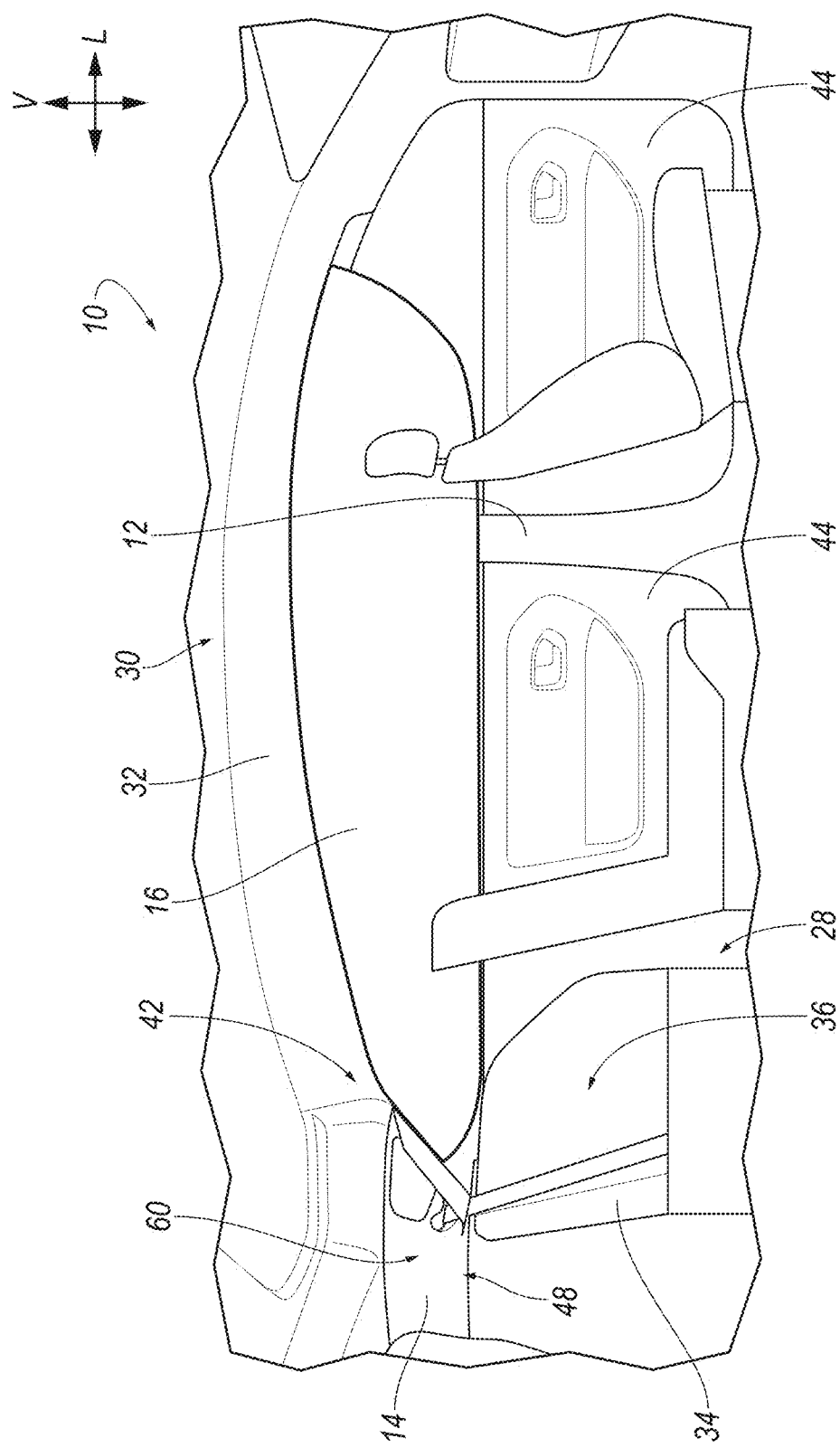
FIG. 2 is the side view of FIG. 1 with the airbag in an inflated position.

As shown in FIG. 2, the airbag 16 extends downwardly from the roof 30 along at least the portion of the body 12 to which the trim panel 14 is connected, e.g., the rear panel in the example shown in the Figures, in the inflated position. The airbag 16 may extend downwardly from the roof 30 along at least one of the doors 44 in the inflated position. In the example shown in the Figures, the airbag 16 extends downwardly along both doors 44 and three pillars in the inflated position. The airbag 16 is supported by the roof 30 in the uninflated position and in the inflated position, i.e., the weight of the airbag 16 is borne by the roof 30 in the uninflated position and in the inflated position. The airbag 16 may deform the headliner 32 as the airbag 16 inflates from the uninflated position to the inflated position, and the airbag 16 may be designed to deform under forces associated with the inflation of the airbag 16.

The airbag 16 may be fabric, e.g., a woven polymer yarn. The woven polymer yarn may be, for example, nylon 6, 6. Other examples of the woven polymer yarn include polyether ether ketone (PEEK), polyetherketoneketone (PEKK), polyester, etc. The woven polymer yarn may include a coating, such as silicone, neoprene, urethane, etc. For example, the coating may be polyorgano siloxane.

The inflator 40 is in fluid communication with the airbag 16. The inflator 40 expands an inflation chamber of the airbag 16 with inflation medium, such as a gas, to move the airbag 16 from the uninflated position to the inflated position. The inflator 40 may be supported by any suitable component. For example, the inflator 40 may be supported by the roof 30. The inflator 40 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 40 may be, for example, at least partially in the inflation chamber to deliver inflation medium directly to the inflation chamber or may be connected to the inflation chamber through fill tubes, diffusers, etc.

A trim panel assembly 60 includes the trim panel 14 and the elastomeric member 26. The trim panel 14 conceals components of the vehicle 10 such as the vehicle body 12, airbag 16, etc., from view of an occupant in the occupant cabin 28. The trim panel 14 includes a class-A surface, i.e., a finished surface exposed to view by a customer and free of unaesthetic blemishes and defects. The class-A surface faces the occupant cabin 28. The trim panel 14 may be plastic. As an example, the trim panel 14 may be acrylonitrile butadiene styrene (ABS), polypropylene, etc.

The trim panel 14 is supported by the vehicle body 12, i.e., the weight of the trim panel 14 is borne by the vehicle body 12, e.g., the rear pillar 42 and/or roof 30 of the vehicle body 12. The trim panel 14 may be directly connected to the vehicle body 12. For example, the trim panel 14 may include connectors 46, e.g., clips, fasteners, brackets, etc., that directly contact and engage the vehicle body 12. In the example shown in the Figures, the trim panel 14 includes spring clips that directly contact and engage the vehicle body 12. Specifically, the base portion 20 of the trim panel 14 is directly connected to the vehicle body 12 when the airbag 16 is in the uninflated position and in the inflated position. In other words, the base portion 20 of the trim panel 14 remains connected to the vehicle body 12 when the airbag 16 inflates to the inflated position. The distal portion 22 of the trim panel 14 may be directly connected to the vehicle body 12 or indirectly connected to the vehicle body 12 through the base portion 20 when the airbag 16 is in the uninflated position. In the example shown in the Figures, the distal portion 22 is free of connectors between the distal portion 22 and the vehicle body 12. In other words, the distal portion 22 is connected to the vehicle body 12 through the base portion 20. In other examples in which the distal portion 22 is directly connected to the vehicle body 12 when the airbag 16 is in the uninflated position, the connector between the distal portion 22 and the body 12 releases during inflation of the airbag 16 as the distal portion 22 rotates relative to the base portion 20 about the weakened area 24. For example, the connector between the distal portion 22 and the body 12 may be designed (i.e., positioned, designed with a holding strength, etc.) to release during inflation of the airbag 16. In the example shown in the Figures, the trim panel 14 extends from the headliner 32 to a lower trim panel 14 and conceals the rear pillar 42 between the headliner 32 and the lower trim panel 14.

The trim panel 14 includes a back side 18 and a front side 48. The back side 18 and the front side 48 extend along the base portion 20 and the distal portion 22. The weakened area 24 is on the back side 18, as described further below.

The back side 18 faces the vehicle body 12. The back side 18 is designed to connect to the vehicle body 12. Specifically, the back side 18 includes the connectors 46 and/or features to engage the connectors 46.

The front side 48 is opposite the back side 18. In other words, the back side 18 faces in a direction and the front side 48 faces in an opposite direction. The front side 48 faces the occupant cabin 28 and is exposed to the occupant cabin 28. The front side 48 defines a boundary of the occupant cabin 28. The front side 48 includes the class-A surface. The class-A surface extends along the base portion 20 and the distal portion 22. The class-A surface is uninterrupted on the front side 48 and extends uninterrupted across the base portion 20 and the distal portion 22.

As set forth above, the trim panel 14 includes the base portion 20, the distal portion 22, and the weakened portion between the base portion 20 and the distal portion 22. As set forth above, the base portion 20 is directly connected to the vehicle body 12 in the uninflated position and in the inflated position. The distal portion 22 is positioned to be impacted by the airbag 16 when the airbag 16 inflates from the uninflated position to the inflated position. Upon inflation of the airbag 16, the airbag 16 impacts the distal portion 22 and rotates the distal end relative to the base portion 20 about the weakened area 24. In the example shown in the Figures, the airbag 16 is between the distal portion 22 and the rear pillar 42 in the uninflated position. The airbag 16 may abut the distal portion 22 in the uninflated position.

The base portion 20, the distal portion 22, and the weakened area 24 are unitary, i.e., a single, uniform piece of material with no seams, joints, fasteners, or adhesives holding the trim panel 14 together. The base portion 20, the distal portion 22, and the weakened area 24 are formed together simultaneously as a single continuous unit, e.g., by molding, machining from a unitary blank, forging, casting, etc. In contrast, non-unitary components are formed separately and subsequently assembled, e.g., by welding, bonding, etc.

The weakened area 24 is between the base portion 20 and the distal portion 22. In the example shown in the Figures, the weakened area 24 extends from the base portion 20 to the distal portion 22. The weakened area 24 is designed to allow the distal portion 22 to bend relative to the base portion 20 from force of an airbag 16 inflating from an uninflated position to an inflated position. Specifically, the size, shape, and location of the weakened area 24 allows the weakened area 24 to deform when the airbag 16 impacts the distal portion 22 during inflation of the airbag 16. In the example shown in the Figures, the weakened area 24 includes at least one indentation 50 on the back side 18 between the base portion 20 and the distal portion 22. Due to the indentation 50, the weakened area 24 has a thinner wall thickness than the adjacent base portion 20 and distal portion 22 such that, when the airbag 16 applies force to the distal portion 22 during inflation of the airbag 16, the moment of force on the distal portion 22 causes deformation at the weakened area 24.

In the examples shown in the Figures, the trim panel 14 includes two indentations 50 and an intermediate portion 62 between the two indentations 50. In such an example, one of the indentations 50 is between the base portion 20 and the intermediate portion 62 and the other of the indentations 50 is between the distal portion 22 and the intermediate portion 62. In such an example, the trim panel 14 may bend at both indentations during inflation of the airbag 16. In the example shown in the Figures, the airbag 16 abuts the intermediate portion 62 in the uninflated position.

The weakened area 24 is on the back side 18. For example, in the example shown in the Figures in which the weakened area 24 is the indentation 50, the indentation 50 is concealed from the occupant cabin 28. In other words, the indentation 50 is not visible from the occupant cabin 28. In the example shown in the Figures, the indentation 50 is elongated along a straight line, i.e., the longest dimension of the indentation 50 is along a straight line so that the indentation 50 allows the distal portion 22 to rotate relative to the base portion 20 about the indentation 50.

The elastomeric member 26 is connected to the back side 18 at the base portion 20 and the distal portion 22. The elastomeric member 26 is directly connected to the base portion 20, and the distal portion 22 is movable with the distal portion 22 as the distal portion 22 rotates relative to the base portion 20 upon inflation of the airbag 16. The elastomeric member 26 remains directly connected to the base portion 20 and the distal portion 22 during and after rotation of the distal portion 22 by the airbag 16.

The elastomeric member 26 is between the airbag 16 and the distal portion 22. The airbag 16 abuts the elastomeric member 26 at the distal portion 22 during inflation of the airbag 16. The airbag 16 may abut the elastomeric member 26 in the uninflated position. The elastomeric member 26 spaces the airbag 16 from the trim panel 14 during inflation of the airbag 16 to the inflated position. The airbag 16 may slide on the elastomeric member 26 when the airbag 16 inflates from the uninflated position to the inflated position.

The elastomeric member 26 extends across the weakened area 24 from the base portion 20 to the distal portion 22 when the airbag 16 is uninflated and when the airbag 16 is inflated. In other words, the elastomeric member 26 remains connected to the base portion 20 and the distal portion 22 and extends across the weakened area 24 from the base portion 20 to the distal portion 22 during and after inflation of the airbag 16. The elastomeric member 26 is designed (e.g., thickness, geometry, and material selection) to maintain the connection to the base portion 20 and the distal portion 22 in the even the distal portion 22 separates from the base portion 20 at the weakened area 24 during inflation of the airbag 16.

The elastomeric member 26 is flexible relative to the base portion 20 and the distal portion 22. The elastomeric member 26 bends more easily than the base portion 20 and the distal portion 22, and the elastomeric member 26 bends relative to the base portion 20 and the distal portion 22 during inflation of the airbag 16. The elastomeric member 26 may resiliently deform during inflation of the airbag 16 and, in some examples, deforms in the absence of plastic deformation. An elastomer is a polymer material that has rubber-like elasticity capable of recovering its original shape after being stretched. The elastomeric member 26 may be, for example, Santoprene®, synthetic rubber, etc.

Figure 3:
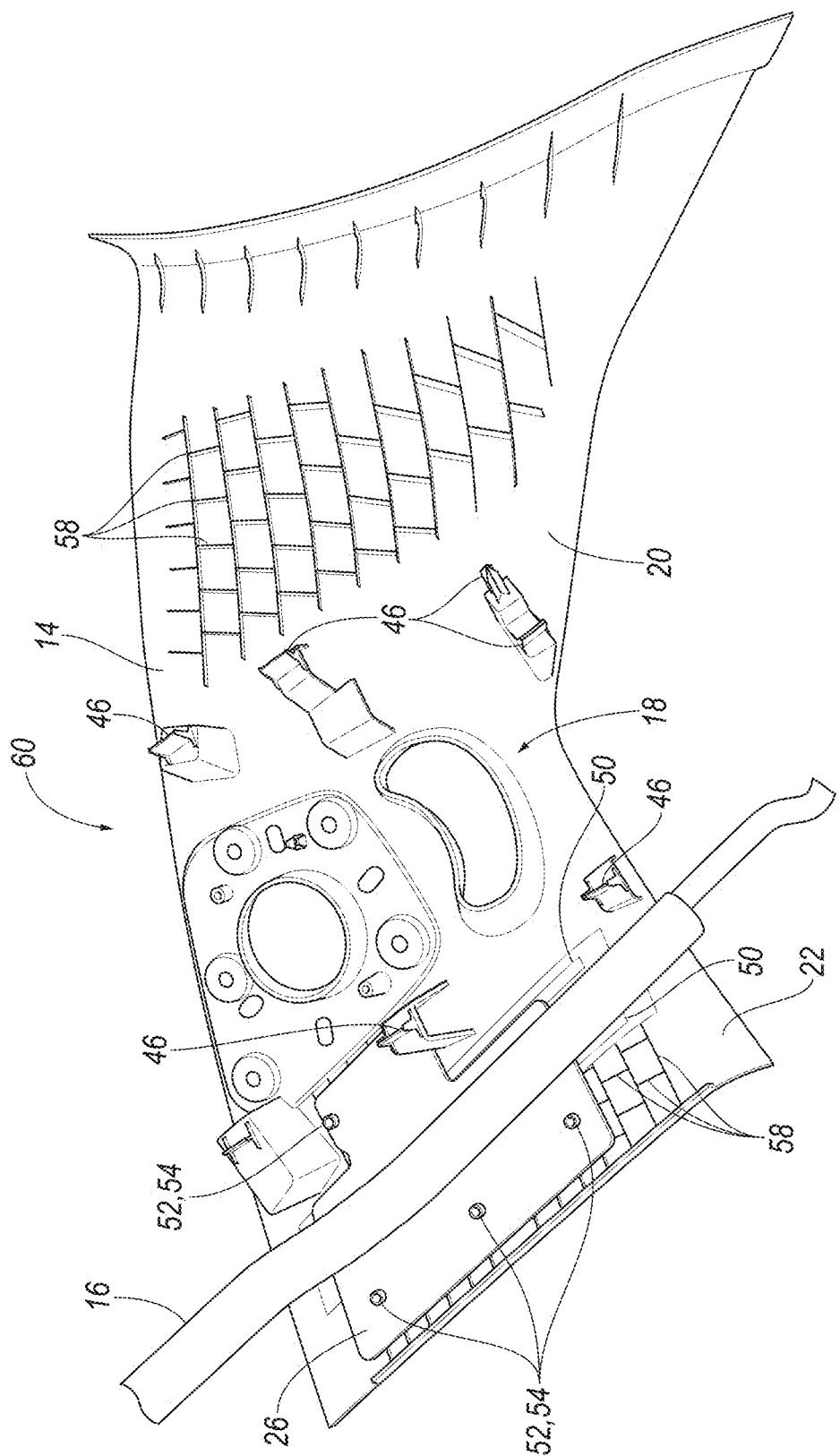
FIG. 3 is a perspective view of the trim panel assembly and an airbag viewed from a back side of a trim panel of the trim panel assembly.
Figure 4:
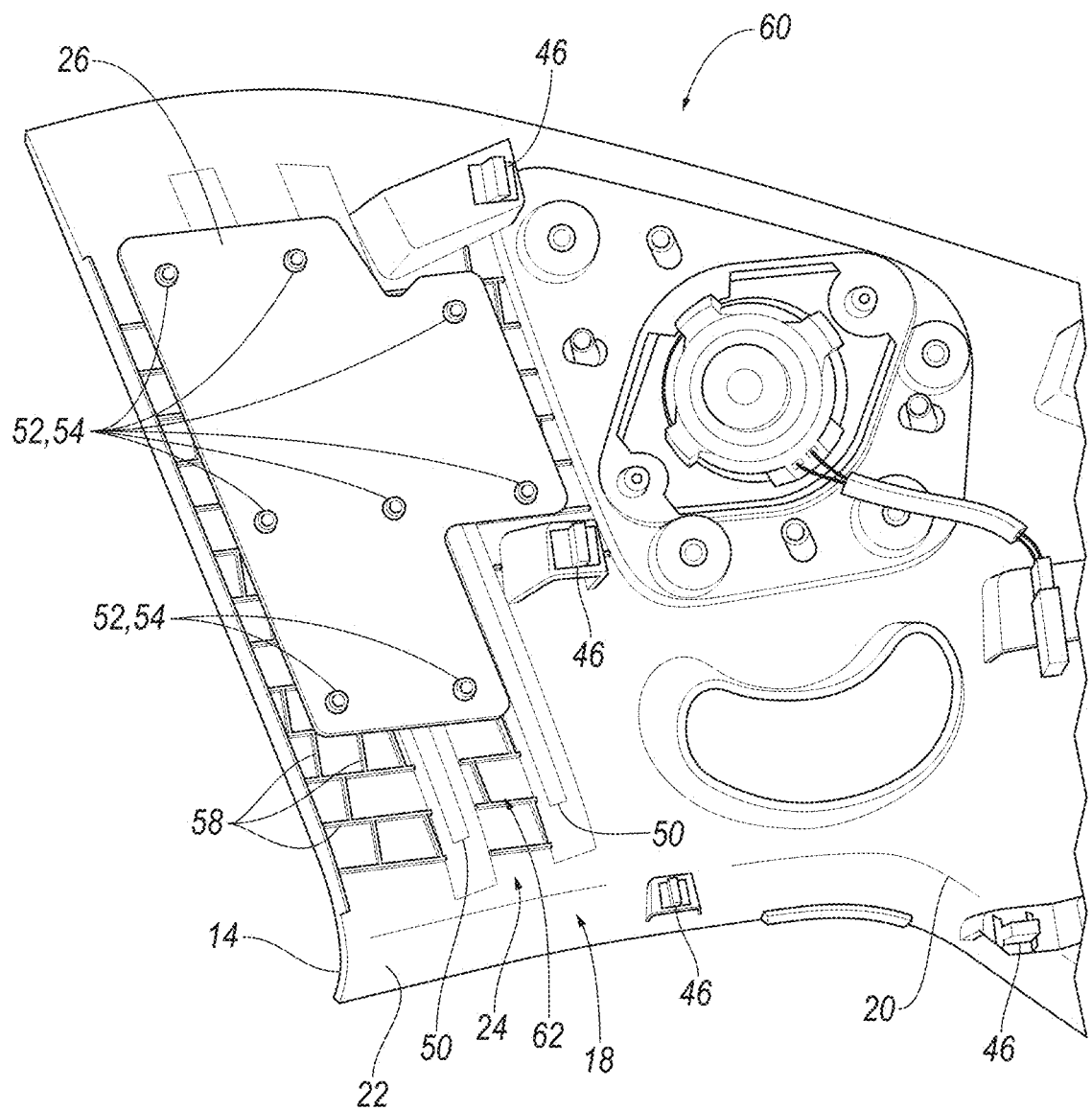
FIG. 4 is a perspective view of the trim panel assembly.
Figure 5:
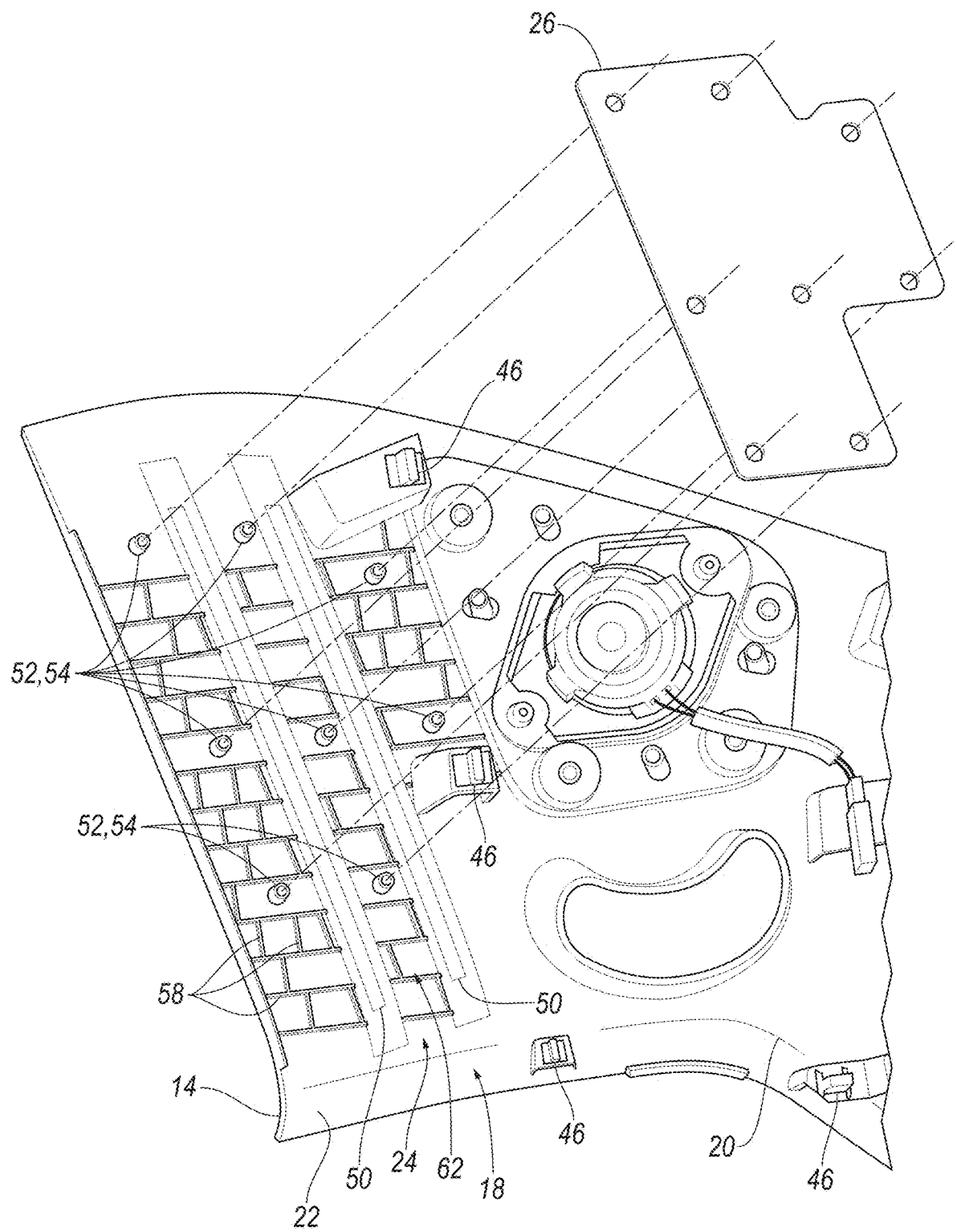
FIG. 5 is an exploded view of the trim panel assembly.

As set forth above, the elastomeric member 26 is connected to the back side 18 at the base portion 20 and the distal portion 22. In the example shown in FIGS. 3-5, the trim panel 14 is connected to the trim panel 14 with mechanical fasteners 52. For example, in FIGS. 3-5, the trim panel 14 has heat stakes 54 that connect the elastomeric member 26 to the back side 18. In such examples, the heat stakes 54 are fixed to the back side 18 and extend through holes in the elastomeric member 26. Each heat stake 54 may include a head at a distal end of the heat stake 54 to retain the elastomeric member 26 on the heat stake 54. For example, during assembly, the heat stakes 54 may be inserted into the holes in the elastomeric member 26, and the distal ends of the heat stakes 54 may be compressed with a heated tool to form the head of the heat stake 54.

Figure 6:
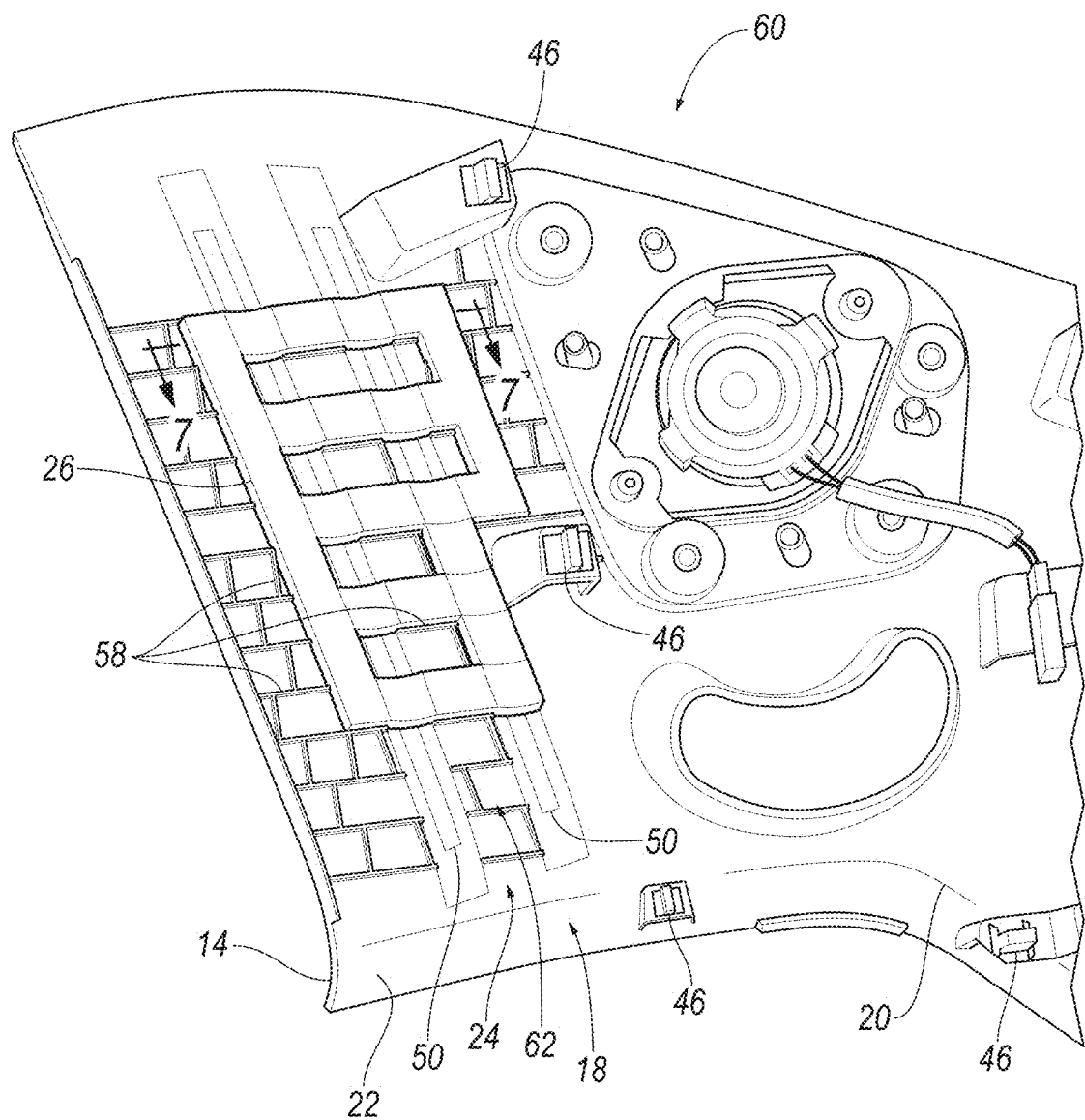
FIG. 6 is another example of the trim panel assembly.
Figure 7:
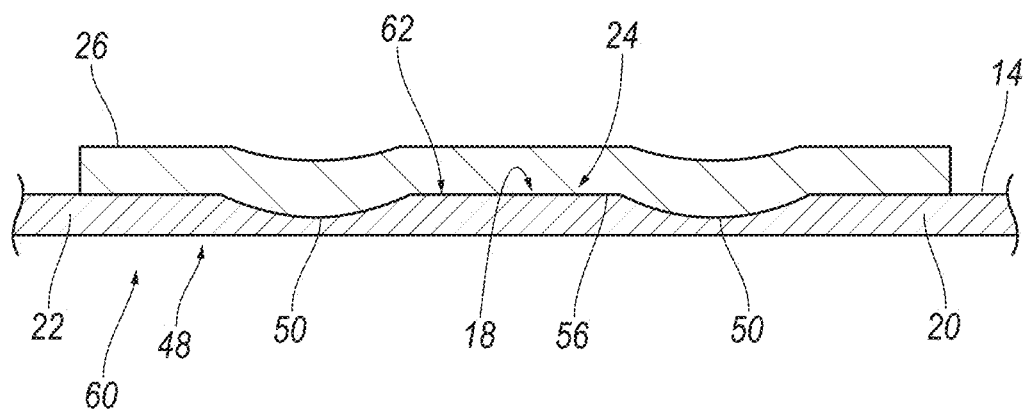
FIG. 7 is a cross-section along line 7 in FIG. 6.

As another example, as in the example in FIGS. 6-7, the elastomeric member 26 may be bonded to the back side 18 at the base portion 20 and the distal portion 22. In such examples, the elastomeric member 26 is joined to the back side 18 with adhesive, heating (e.g., during molding of the elastomeric member 26), and/or pressure. In other words, the elastomeric member 26 is bonded to the back side 18 at an interface 56. As one example, the elastomeric member 26 may be overmolded on the trim member. "Over-molded" is a structural description of the elastomeric member 26 and the interface 56 between the elastomeric member 26 and the trim panel 14, not the process by which the elastomeric member 26 is made. In other words, the elastomeric member 26 and the interface 56 between the elastomeric member 26 and the trim panel 14 have the structure of an over-molded component. When over-molded, the elastomeric member 26 may be a single, uniform piece of material with no seams, joints, and may be fixed to the trim panel 14 without fasteners or adhesives holding the elastomeric member 26 and the trim panel 14 together. In such an example, the elastomeric member 26 has a shape that conforms to a mold, e.g., an injection mold, used to form the elastomeric as an over-molded component to the trim panel 14. In other examples, the elastomeric member 26 is fixed to the trim panel 14 with fasteners, adhesive, etc. In some examples, the elastomeric member 26 may be connected to the back side 18 by both mechanical fastener 52 and bonding.

The trim panel 14 may include ribs 58 on the back side 18. The ribs 58 increase structural rigidity of the base portion 20 and the distal portion 22. In some examples, such as in FIGS. 3-5, the elastomeric member 26 may extend across multiple ribs 58. In other examples, such as in FIGS. 6-7, the elastomeric member 26 may be disposed between ribs 58.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   a vehicle body;
   a trim panel supported by the vehicle body;
   an airbag between the trim panel and the vehicle body;
   the trim panel including a back side facing the vehicle body;
   the trim panel including a base portion and a distal portion;
   the trim panel including a weakened area between the base portion and the distal portion on the back side; and
   an elastomeric member connected to the back side at the base portion and the distal portion, the elastomeric member extending across the weakened area from the base portion to the distal portion.

2. The vehicle as set forth in claim 1, wherein the airbag abuts the elastomeric member at the distal portion.

3. The vehicle as set forth in claim 1, wherein the base portion, the distal portion, and the weakened area are unitary.

4. The vehicle as set forth in claim 1, wherein the trim panel includes a front side opposite the back side, the front side including a class-A surface.

5. The vehicle as set forth in claim 4, wherein the class-A surface extends along the base portion and the distal portion.

6. The vehicle as set forth in claim 1, wherein the weakened area is an indentation on the back side between the base portion and the distal portion.

7. The vehicle as set forth in claim 6, wherein the indentation is elongated along a straight line.

8. The vehicle as set forth in claim 1, wherein the weakened area extends from the base portion to the distal portion.

9. The vehicle as set forth in claim 1, wherein the weakened area is designed to allow the distal portion to bend relative to the base portion from force of the airbag inflating from an uninflated position to an inflated position.

10. The vehicle as set forth in claim 9, wherein the distal portion is positioned to be impacted by the airbag when the airbag inflates from the uninflated position to the inflated position.

11. The vehicle as set forth in claim 1, wherein the elastomeric member is bonded to the back side of the trim panel.

12. The vehicle as set forth in claim 1, wherein the trim panel is plastic.

13. A vehicle interior trim panel assembly comprising:
    a trim panel including a base portion and a distal portion;
    the trim panel including a back side designed to connect to a vehicle body;
    the trim panel including a front side opposite the back side, the front side including a class-A surface extending along the base portion and the distal portion;
    the trim panel including a weakened area between the base portion and the distal portion on the back side, the weakened area being designed to allow the distal portion to bend relative to the base portion from force of an airbag inflating from an uninflated position to an inflated position; and
    an elastomeric member connected to the back side at the base portion and the distal portion, the elastomeric member extending across the weakened area from the base portion to the distal portion.

14. The vehicle as set forth in claim 13, wherein the base portion, the distal portion, and the weakened area are unitary.

15. The vehicle as set forth in claim 13, wherein the weakened area is an indentation on the back side between the base portion and the distal portion.

16. The vehicle as set forth in claim 15, wherein the indentation is elongated along a straight line.

17. The vehicle as set forth in claim 15, wherein the weakened area extends from the base portion to the distal portion.

18. The vehicle as set forth in claim 13, wherein the elastomeric member is bonded to the back side of the trim panel.

* * * * *